United States Patent
Light et al.

(10) Patent No.: US 7,020,383 B2
(45) Date of Patent: *Mar. 28, 2006

(54) DETECTING AND THWARTING IMAGING SYSTEMS AT THEATRICAL PERFORMANCES

(76) Inventors: Elliott D. Light, 12 Bentana Way, Rockville, MD (US) 20850; Jon L. Roberts, 529 Clear Spring Rd., Great Falls, VA (US) 22066

(*) Notice: Subject to any disclaimer, the term of this patent is extended or adjusted under 35 U.S.C. 154(b) by 0 days.

This patent is subject to a terminal disclaimer.

(21) Appl. No.: 11/122,425

(22) Filed: May 5, 2005

(65) Prior Publication Data

US 2005/0194522 A1    Sep. 8, 2005

Related U.S. Application Data

(63) Continuation-in-part of application No. 10/816,970, filed on Apr. 2, 2004, now Pat. No. 6,977,366, which is a continuation-in-part of application No. 10/294,273, filed on Nov. 14, 2002, now Pat. No. 6,861,640.

(51) Int. Cl.
*H04N 5/91* (2006.01)

(52) U.S. Cl. ............ 386/94; 380/201; 340/539.1

(58) Field of Classification Search ......... 250/221, 250/208.2, 208.4; 352/38, 39; 380/201; 353/122, 90, 34; 386/94; 360/60; 348/744; 340/539.1

See application file for complete search history.

(56) References Cited

U.S. PATENT DOCUMENTS

| | | | |
|---|---|---|---|
| 6,018,374 A * | 1/2000 | Wrobleski | 348/744 |
| 6,529,600 B1 * | 3/2003 | Epstein et al. | 380/252 |
| 6,674,561 B1 * | 1/2004 | Ohnishi et al. | 359/238 |
| 6,742,901 B1 * | 6/2004 | Kimura et al. | 353/122 |
| 6,771,349 B1 * | 8/2004 | Sitrick et al. | 352/85 |
| 6,809,792 B1 * | 10/2004 | Tehranchi et al. | 352/85 |
| 6,868,229 B1 * | 3/2005 | Balogh | 386/117 |
| 2004/0091110 A1 * | 5/2004 | Barkans | 380/201 |

FOREIGN PATENT DOCUMENTS

| | | |
|---|---|---|
| EP | 1 057 323 | 2/2002 |
| WO | WO 00/74366 | 12/2000 |
| WO | WO 00/74366 A2 * | 12/2000 |

OTHER PUBLICATIONS

Smarthome.com: Universal Keychain Remote Product Description, Internet product order form, http://www.smarthome.com/8001.html.
PoGo! Products: "About PoGo! Products, Inc.," Internet product listing/ general information, http:www.pogoproducts.com/about.html; http:www.pogoproducts.com/remote_controls.html.
Gary Brown, How Autofocus Cameras Work:, Internet Article, http://travel.howstuffworks.com/autofocus.htm.

* cited by examiner

*Primary Examiner*—David Porta
*Assistant Examiner*—Stephen Yam
(74) *Attorney, Agent, or Firm*—Roberts Abokhair & Mardula, LLC

(57) ABSTRACT

A system and method of detecting and thwarting the use of unauthorized imaging systems at theatrical performances. Sensors are deployed at a theatrical event to detect a focusing signal and/or the RF signal of an unauthorized imaging device. De-focusing signals are used to disrupt the auto focus system of imaging devices that do not use IR focusing systems. A thwarting signal comprising invisible light frequencies may be combined to produce a thwarting signal that is received by the CCD of an imaging device as white light thereby rendering the recorded image unusable.

30 Claims, 1 Drawing Sheet

DETECTING AND THWARTING IMAGING SYSTEMS AT THEATRICAL PERFORMANCES

RELATIONSHIP TO OTHER APPLICATIONS

This application is a continuation in part of U.S. application Ser. No. 10/816,970, filed Apr. 2, 2004 now U.S. Pat. No. 6,977,366, which is a continuation in part of U.S. application Ser. No. 10/294,273, filed Nov. 14, 2002, now U.S. Pat. No. 6,861,640, both of which are hereby incorporated by reference for all purposes and from which priority is claimed.

BACKGROUND

The present invention relates generally to the field of entertainment. More specifically, the present invention is a system and method of detecting and thwarting the use of unauthorized imaging systems at theatrical performances.

Entertainment is a multibillion-dollar business. Movies, plays, and concerts represent investments that have both a time value and an intellectual property value. The time value of an entertainment asset is usually very high, but reflects the reality that over time the demand for an entertainment asset will decline as access to the asset increases or as competition from other entertainment assets increases. For example, a movie is most valuable when it is first released to theaters and the potential audience is exposed to advertising and hype about the movie. The movie declines in value over time as the audience has viewed the movie and as other movies are released.

Entertainment assets also have an intellectual property value. A movie, for example, that has completed its theater run has potential value as a video for sale or rental purposes. The movie is a copyrighted asset and that asset can be sold or licensed. Similarly, a live performance has its own copyright that is highly valuable and requires protection.

Increasingly, entertainment assets are subject to piracy. Theaters and other venues that admit patrons to movies, concerts, and plays forbid the motion picture filming, video recording or still photograph recording of performances. However, it is difficult to police such conditions of admission. Finding a video camera or other imaging system in a large, dark theater is a significant challenge. It is also the case that within days or even hours of the release of a new movie, pirated copies of varying quality are available for sale on the street. Such copies are frequently the result of an unscrupulous individual taking a video camera into the theater and simply filming or recording the movie. Copies can then be rapidly made in a "boiler room" environment and sold on the street. And this does not only apply to movies. Live concerts and performances are equally protected by the copyright laws and, unfortunately, are equally as vulnerable to this form of pirating. Additionally, a still camera can image a performer in concert even when such taking of pictures is prohibited. What is needed is a means of detecting, locating and/or thwarting the use of an imaging system that is being used to surreptitiously film a theatrical performance.

SUMMARY

An embodiment of the present invention is a system and method of detecting, locating and/or thwarting the use of an imaging system that is being used to surreptitiously film a theatrical event. For purposes of this application, the phrase "imaging system" is used to describe any still or movie camera whether digital or tape based having a storage medium capable of recording and reconstructing a theatrical perform. The term "thwarting" is used to describe any action that either detects that a recording is being made, stops the recording or renders the recording useless, or any combination thereof.

It is an aspect of the present invention to detect and locate an imaging system that is being used to surreptitiously film a theatrical event.

It is another aspect of the present invention to detect the infrared auto focus beam emitted by an imaging system being used to surreptitiously film a theatrical event.

It is yet another aspect of the present invention to detect the radio frequency signature of an imaging system being used to surreptitiously film a theatrical event.

It is still another aspect of the present invention to detect both still and video imaging systems.

It is an aspect of the present invention to thwart the recording of a theatrical event by an imaging system by interfering with the recording process or rendering the recording useless for viewing.

It is another aspect of the present invention to "blast" an image recording system when any focus beam is detected.

It is another aspect of the present invention to periodically blast the viewing area to thwart recording even when a focus beam is not detected.

It is still another aspect of the present invention to halt a theatrical experience upon detection of a focus beam.

It is a further aspect of the present invention to precisely record the focus beam in use, and characterize that beam to produce a more effective thwarting signal and for later forensic analysis.

These and other aspects of the present invention will become apparent from a review of the detailed description that follows.

In general terms, the system and method of the present invention detects the auto focus function of an imaging system and provides signals that thwart the recording of any images by that system. Further, the present invention does not require that an auto focus system be detected. For example, and without limitation, a thwarting signal may be continuously sent out over an audience at a theatrical event to adversely affect the functioning of an imaging system.

An embodiment of the present invention provides a system for detecting the pirating of a theatrical experience. A sensor is arranged spatially proximate to the area wherein the theatrical experience is taking place and connected to a network. The sensor is adapted to sense an auto focus emission from an imaging system and to send a signal in the event an auto focus emission is received. Alternative embodiments allow for the distribution of multiple sensors to detect the auto focus emission(s). In still another alternate embodiment, the plurality of sensors is further adapted to receive radio frequency emissions from an imaging system. In another embodiment of the present invention, the sensor (s) adapted to receive radio frequency emissions is located in audience seating fixtures. Hence, when the application refers to the term "sensor" it will be understood by those skilled in the art that this is not meant as a limitation. Multiple sensors may also be used to effect the detection of surreptitious recording as noted herein.

A processor connected to the network and adapted to receive the signal from the sensor(s) initiates a "remedial action" if the a focusing signal is received from an imaging system. For purposes of this application, the term "remedial action" means an alert provided to managers of the performance or venue that an unauthorized recording is taking place. Alternatively, the "remedial action" is a flag or trigger created upon sensing of the unauthorized recording that in turns triggers an automated response in the form of the thwarting signal that disrupts the recording.

In one embodiment of the present invention the processor comprises a computer program for determining the location of the imaging system from which the emission emanates. In an embodiment of the present invention, the area wherein the theatrical experience is taking place is a room and the sensor is located on the interior walls defining the room. In another embodiment of the present invention, the area wherein the theatrical experience is taking place is an outdoor theater and the sensor is mounted on structures arranged spatially so as to surround a space occupied by an audience.

In an embodiment of the present invention, a method of detecting the pirating of a theatrical experience is provided. A sensor is located proximate to the area in which the theatrical experience is taking place. The sensor receives auto focus emissions from an imaging system. A processor receives the output of the sensor. If auto focus emissions from an imaging system are detected, an alarm is initiated that alerts appropriate authorities and/or which serves to initiate an automated response by the system of the present invention in the form of a thwarting signal. Optionally, the sensor receives radio frequency emissions of an imaging system. Additionally, the processor may further comprise software means for determining the location of the source of auto focus emissions received by the sensor. Through the use of well known triangulation techniques, a physical location of an imaging system from which an auto focus emission is occurring can be determined.

In yet another embodiment of the present invention, a method of thwarting the pirating of a theatrical experience is provided. A thwarting signal generator is located proximate to the area in which the theatrical experience is taking place. The thwarting signal generator may, for example, be near the stage aimed into the audience, or be located on the walls of a room or at a various other points whereby the signal will cover the audience area from which the auto focus signal is emanating. The thwarting signal that is emitted is preferably visible to the imaging system but not visible to the human eye. Unauthorized imaging systems may be, without limitation, a still camera, a moving picture camera, a CCD array camera, and a cellular telephone camera. In one embodiment of the present invention, the thwarting signal is in the infrared region of the spectrum. In another embodiment of the present invention, the thwarting signal is a short duration visible light signal not visible to the human eye. In still another alternative embodiment, the thwarting signal may be in the RF region of the electromagnetic spectrum. Alternatively, the thwarting signal is emitted from a thwarting signal generator attached to on-stage equipment. In another embodiment of the present invention, the thwarting signal is emitted from a thwarting signal generator attached to the periphery of a stage. In yet another embodiment of the present invention, the thwarting signal is emitted from a thwarting signal generator positioned behind a screen. It will be apparent to those skilled in the art that other locations for the thwarting signal generator(s) are a matter of design choice based upon the configuration of the audience to be covered and the signal strength needed or dictated by laws and regulations.

In another embodiment of the present invention, a method of thwarting the pirating of a theatrical experience is provided. A plurality of thwarting signal generators are located proximate to the area in which the theatrical experience is taking place. A thwarting signal that is detectable by the unauthorized imaging system but that is not visible to the human eye is emitted.

DETAILED DESCRIPTION

Figure 1:
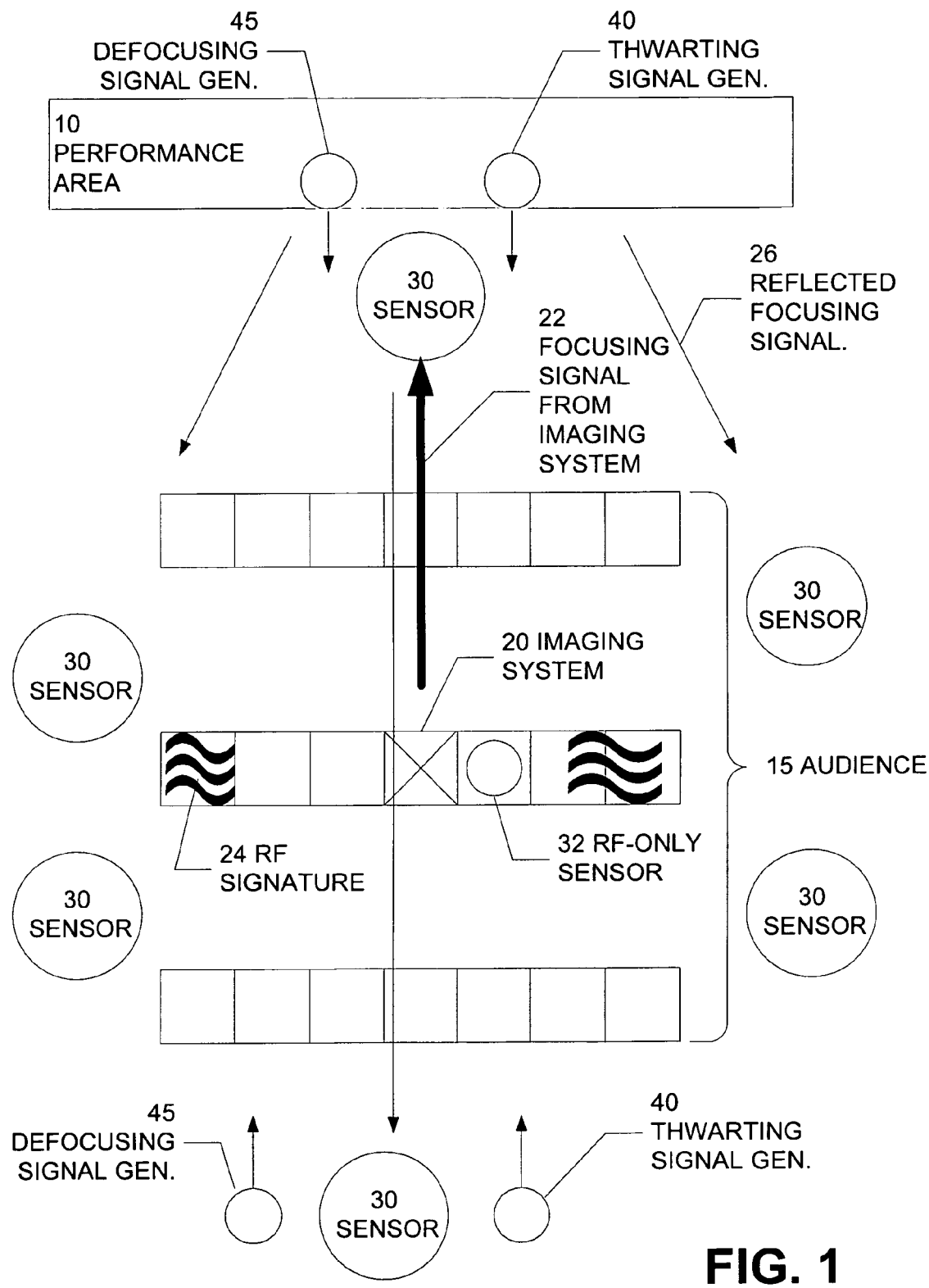
FIG. 1 illustrates a block diagram of a thwarting system configured for use during a theatrical performance according to an embodiment of the present invention.

In one embodiment of the present invention, infrared (IR) sensors are installed on the performance area (i.e., a stage or screen) where the theatrical event is being performed and on structures to the sides and back of the performance area, and on structures above the audience. The IR sensors are sensitive to IR energy emitted by range finders (auto focus devices) used in imaging system equipment. This IR light is generally emitted by an imaging system as a main beam at a target. The target reflects the light back to the imaging system where it is received and processed to determine the distance of the target from the imaging system.

The IR light transmitters on an imaging system not only emit a main beam of IR light, but also emit less powerful side lobes that can be detected by IR sensors of the present invention located on either side of the imaging system. Alternatively, IR sensors can be placed on stage, at the back of a stage, on equipment or scenery that is on stage in order to capture the fact that the main IR beam is being used to focus on performers at a performance. In the case of a movie screen, a "pinhole" aperture in the screen may also be used with a detector behind the screen to again capture the fact that an IR beam (or other energy) is being used to focus on the screen. Such a pinhole aperture would be unseen by the audience but allow energy to be sensed.

Further, the present invention provides IR sensors located behind the imaging system for detecting the IR radiation reflected from the target. These sensors are placed in fixed locations on the back wall of the theatre, for example, or in the case of so-called "stadium" seating, on the front walls of the various tiers of the theater. Sensors in the ceiling may also be used to pick up IR scattered by the target.

Not all IR emitters emit in precisely the same way. Thus part of the present invention is to not only detect that a focusing signal is present, but to record and characterize that signal. Thus for forensic purposes, one could then later reconstruct the type of imaging system used, and potentially, even the brand of IR emitter used and even the precise emitter. Since copyright violations are criminal in nature, this information can be used for later prosecution efforts. Additionally, this analysis of the IR signal can be used in real time to send a thwarting signal tuned or adapted to the emitter that is detected so that a more effective thwarting signal can be created.

Some video cameras do not use IR for auto focus but rely on the incoming light for optimization of imaging being recorded. In these imaging systems, a CCD image sensor and an associated processor will sense incoming wave forms of light reflected from, for example, a screen in movie theater and will create an image as sharp as possible. Because the sharpest image possible requires the highest possible frequency, the system tries to find the highest frequency in the incoming image and adjust the position of the CCD to optimize reception of this frequency. In another embodiment of the present invention, a de-focusing signal is used to disrupt this type of auto focus system In this embodiment, the de-focusing signal is a high frequency light pulse that is emitted from a source that is in front of or behind the performance area, thereby causing the imaging system to misfocus the recorded image or to cause the imaging system to constantly change in focus point. In another embodiment, a plurality of de-focusing signals is used at various focal points to disrupt the recording process. Again, the sources for such energy can be at the periphery of a venue, on equipment that is on-stage or directly behind the performers or other locations where the energy can be aimed at an audience for image disruption purposes.

A passive auto focus system uses contrast to determine when focus of an image has been achieved. The microprocessor in an imagining devices looks at a strip of pixels and looks at the difference in intensity among the adjacent pixels. If the image is out of focus, adjacent pixels have very similar intensities. The microprocessor moves the lens, looks at the CCD's pixels again and sees if the difference in intensity between adjacent pixels improved or got worse. The microprocessor then searches for the point where there is maximum intensity difference between adjacent pixels— that is the point of best focus.

In an embodiment of the present invention, a thwarting signal comprises a brief pulse of light that causes the contrast of an image to change, thereby affecting the ability of the auto focusing system to determine a proper focus of the scene. In an embodiment of the present invention, the pulse rate is faster than the human eye can respond, thereby making the pulse "invisible" to humans even if the light frequency is within the visible spectrum.

In still another embodiment of the present invention, a "thwarting signal" comprises a light source emitting energy in the light spectrum that is not visible to the human eye but which is detectable by the CCD of a digital imaging system. By way of example and not as a limitation, many CCDs used in video cameras are sensitive to IR energy. A thwarting signal comprising IR energy would be seen in a recording as a white light. Other invisible light frequencies may be combined to produce a thwarting signal of this kind. As new CCDs are developed, the thwarting signal may thus be adjusted to accommodate the spectral sensitivity of the CCD to achieve the thwarting objectives previously described. In another embodiment, the thwarting signal is projected onto a screen from a movie projector. In another embodiment, the thwarting signal is projected outward from the performance area of a live performance.

In addition, with new generations of imaging cellular telephone, the potential for a "non-focusing" system is even more present. The thwarting signals of the present invention operate to disrupt the imaging capabilities of such devices.

Because the human eye cannot detect short duration pulses of light, a thwarting signal may comprise light energy in the visible spectrum. In this embodiment, light is pulsed at high energy, but not sufficiently high to be detected by the human eye. In another embodiment, a thwarting signal comprises both light from the visible and invisible spectrum and is pulsed to thwart a recording of a theatrical event.

FIG. 1 illustrates a block diagram of a thwarting system configured for use during a theatrical performance according to an embodiment of the present invention. Referring to FIG. 1, a theatrical performance is performed on performance area 10 and viewed by audience 15. A member of the audience is filming the theatrical performance using an imaging system 20. The imaging system 20 emits both a focusing signal 22 and an RF signature 24. In an embodiment of the present invention, the focusing signal is an IR light signal. However, the present invention is not so limited. Other focusing signals may be utilized without departing from the scope of the present invention. The focusing signal is reflected 26 from the focal object. Additionally, side lobes of the focusing signal produced by the auto focus system of the imaging system are radiated perpendicular to the direction of the lens. Sensors 30 are placed at the performance area (out of view of the audience), to the sides of the audience, and at the back of the audience to receive both the focusing signal and the RF signature of the imaging system. An RF-only sensor 32 is deployed in a seat of the audience. In a preferred embodiment, each seat would be equipped with an RF-only sensor 32.

Thwarting signal generators 40 and defocusing signal generators 45 are also illustrated forward and behind imagining system 20. However, the present invention is not so limited. Thwarting signal generators 40 and defocusing signal generators 45 may be place to the side of and overhead of the imaging system 20.

In an embodiment of the present invention, the IR sensors are connected to a processor through a network. When the processor receives data from the IR sensors the data may be used to mathematically triangulate the approximate location of the imaging system using means known in the art.

In another embodiment of the present invention, RF detectors are used in lieu of or in addition to IR sensors. In this embodiment, the RF detectors scan the audience for an RF signature that matches a fingerprint of a digital camera. In another embodiment of the present invention, the RF detectors are used in conjunction with the IR sensors and allow the IR sensors to be focused on a suspected operating camera. Additionally, RF detectors may be installed in the audience seating fixtures.

In still another embodiment, thwarting signal generators 40 and defocusing signal generators 45 are deployed without detectors.

The system of the present invention is moveable. For example, it is envisioned that a touring theatrical event can uninstall the system at one event and transport it to the next event and install it there. Thus the producers of that theatrical event can have some assurances that protection will be afforded to the performance wherever it goes.

A system and method of detecting and thwarting the use of unauthorized imaging systems at theatrical performances has now been illustrated. It will be understood by those skilled in the art of the present invention that the systems and methods of the present invention can be used with or without detecting a focusing signal. Thus the invention will be useful in providing periodic "blasts" of energy to thwart the recording of a theatrical event even when detection of a focusing signal has not occurred. Whether or not a focusing signal has been detected, a variety of thwarting signals in the visible, near-IR and RF frequencies may be used to disrupt the imaging on an event. Further, although the claims herein discuss a single sensor or thwarting signal generator, this is not meant as a limitation. The present invention anticipates that multiple sensors and thwarting signal generators are to be used in preferred embodiments, the number and strength of which will vary depending on the size and shape of the venue in which the theatrical experience is taking place. Additionally, the systems and methods may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A thwarting system for preventing the pirating of a theatrical experience comprising:
   a processor; and
   a sensor arranged spatially proximate to an area wherein the theatrical experience is taking place and connected to a thwarting system network, wherein the sensor is adapted to:
   detect RF noise emission data from the area in which the theatrical experience is taking place; and
   send the RF noise emission data to the processor; and wherein the processor is connected to the network and adapted to:
   receive the RF noise emission data-from the sensor;
   determine if the RF noise emission data is indicative of the presence of an imaging device; and
   if the RF noise emission data are indicative of the presence of the imaging device,
   initiate a remedial action.

2. The system of claim 1 further comprising a thwarting signal generator and wherein the remedial action comprises commanding the thwarting signal generator to transmit a thwarting signal for disrupting the imaging system.

3. The system of claim 2, wherein the processor is further adapted to characterize the emission data received as an emission signature of the imaging device and to associate the emission signature with the thwarting signal.

4. The system of claim 3 wherein the system thrther comprises an emission signature datastore comprising emission signatures, and wherein the processor is farther adapted to store the emission signature and the associated thwarting signal in the emission signature datastore.

5. The system of claim 2 wherein the thwarting signal generator comprises an RF thwarting signal generator.

6. The system of claim 4 wherein the thwarting signal generator comprises an IR thwarting signal generator.

7. The system of claim 4 wherein the thwarting signal generator comprises a visible light pulse signal generator having a pulse rate, wherein the pulse rate renders the light pulse signal undetectable to a human observer.

8. The system of claim 1 wherein the area wherein the theatrical experience is taking place is a room and the sensor is located on the interior walls defining the room.

9. The system of claim 1 wherein the area wherein the theatrical experience is taking place is an outdoor theater and the sensor is mounted on structures arranged spatially so as to sense the area occupied by an audience.

10. The system of claim 1 wherein the processor comprises a computer program for determining the location of the imaging system from which the emission emanates.

11. The system of claim 1 wherein the sensor is adapted to receive radio frequency emissions and is located in audience seating fixtures.

12. A method of detecting the pirating of a theatrical experience comprising a sensor located proximate to an area in which the theatrical experience is taking place, the method comprising:
   receiving at the sensor RF noise emission data from the area in which the theatrical experience is taking place;
   receiving at a processor the RF noise emission data from the sensor;
   determining at the processor whether the RF noise emission data are indicative of the presence of an imaging system; and
   initiating a remedial action if the RF noise emission data are indicative of an imaging system.

13. The method of claim 12 wherein the initiating a remedial action comprises automatically generating a thwarting signal for disrupting the imaging system.

14. The method of claim 12 further comprising characterizing the RF noise emission data received by the processor.

15. The method of claim 14 further comprising using the characterized RF noise emission data to generate a thwarting signal particular to the characterized auto focus emission.

16. The method of claim 13 wherein the automatically generating the thwarting signal for disrupting the imaging system comprises generating an RF thwarting signal.

17. The method of claim 13 wherein the automatically generating the thwarting signal for disrupting the imaging system comprises generating an IR thwarting signal.

18. The method of claim 13 wherein the automatically generating the thwarting signal for disrupting the imaging system comprises generating a pulsed visible light thwarting signal.

19. The method of claim 12, wherein the method further comprises determining the location of the source of the emissions data received by the sensor.

20. A method of thwarting the pirating of a theatrical experience, wherein a thwarting signal generator is located proximate to an area in which a theatrical experience is taking place, the method comprising:
   detecting RF noise emissions indicative of the presence of an imaging device within the area in which the theatrical experience is taking place using a sensor arranged spatially proximate to an area wherein the theatrical experience is taking place; and
   emitting a thwarting signal that is visible to an imaging system but that is not visible to the human eye.

21. The method of thwarting the pirating of a theatrical experience of claim 20, wherein said emitting the thwarting signal that is visible to an imaging system but that is not visible to the human eye comprises emitting a thwarting signal that is in the infrared region of the spectrum.

22. The method of thwarting the pirating of a theatrical experience of claim 20, wherein said emitting the thwarting signal that is visible to an imaging system but that is not visible to the human eye comprises emitting a thwarting signal comprising a short duration visible light signal not visible to the human eye.

23. The method of thwarting the pirating of a theatrical experience of claim 20, wherein said emitting the thwarting signal comprises emitting the thwarting signal from a thwarting signal generator attached to on-stage equipment.

24. The method of thwarting the pirating of a theatrical experience of claim 20, wherein said emitting the thwarting signal comprises emitting the thwarting signal from a thwarting signal generator attached to the periphery of a stage.

25. The method of thwarting the pirating of a theatrical experience of claim 20, wherein said emitting the thwarting signal comprises emitting the thwarting signal from a thwarting signal generator positioned behind a screen.

26. The method of thwarting the pirating of a theatrical experience of claim 20, wherein said emitting the thwarting signal that is visible to an imaging system comprises emitting a thwarting signal to a still photo camera.

27. The method of thwarting the pirating of a theatrical experience of claim 20, wherein said emitting the thwarting signal that is visible to an imaging system comprises emitting a thwarting signal to a moving picture camera.

28. The method of thwarting the pirating of a theatrical experience of claim 20, wherein said emitting the thwarting signal that is visible to an imaging system comprises emitting a thwarting signal to a CCD array camera.

29. The method of thwarting the pirating of a theatrical experience of claim 20, wherein said emitting the thwarting signal that is visible to an imaging system comprises emitting a thwarting signal to an imaging cellular telephone.

30. A method for interfering with an imaging system involved in pirating a theatrical experience comprising:

detecting RF noise emissions indicative of the presence of an imaging device within the area in which the theatrical experience is taking place using a sensor arranged spatially proximate to an area wherein the theatrical experience is taking place; and emitting a thwarting signal of a short duration visible light signal not visible to the human eye, wherein the thwarting signal is varied in intensity.

* * * * *